US006799746B2

(12) United States Patent
Schäfer

(10) Patent No.: US 6,799,746 B2
(45) Date of Patent: Oct. 5, 2004

(54) ELECTROMAGNET, IN PARTICULAR A PROPORTIONAL MAGNET FOR OPERATING A HYDRAULIC VALVE

(75) Inventor: Jens Schäfer, Herzogenaurach (DE)

(73) Assignee: Ina-Schaeffler KG (DE)

( * ) Notice: Subject to any disclaimer, the term of this patent is extended or adjusted under 35 U.S.C. 154(b) by 192 days.

(21) Appl. No.: 10/282,313

(22) Filed: Oct. 28, 2002

(65) Prior Publication Data

US 2003/0080305 A1 May 1, 2003

(30) Foreign Application Priority Data

Oct. 26, 2001 (DE) ........................................ 101 53 019

(51) Int. Cl.$^{7}$ ................................................ F16K 31/00
(52) U.S. Cl. .............................. 251/129.07; 251/129.21
(58) Field of Search ....................... 251/129.07, 129.15, 251/129.18, 129.19, 129.2, 129.21

(56) References Cited

U.S. PATENT DOCUMENTS

| | | | | | |
|---|---|---|---|---|---|
| 2,923,520 | A | | 2/1960 | Ray | 251/54 |
| 4,074,700 | A | * | 2/1978 | Engle | 137/625.27 |
| 4,513,945 | A | * | 4/1985 | Otsuki et al. | 251/129.15 |
| 4,778,147 | A | * | 10/1988 | Kozuka et al. | 251/129.08 |
| 5,647,644 | A | * | 7/1997 | Volz et al. | 303/119.2 |
| 5,947,092 | A | * | 9/1999 | Hussey et al. | 123/568.26 |
| 5,969,589 | A | | 10/1999 | Raj | 335/277 |
| 6,022,086 | A | * | 2/2000 | Braum | 303/119.2 |
| 6,036,447 | A | * | 3/2000 | Kawaguchi et al. | 417/222.2 |
| 6,182,646 | B1 | * | 2/2001 | Silberstein et al. | 123/568.26 |
| 6,315,268 | B1 | * | 11/2001 | Cornea et al. | 251/129.15 |
| 2003/0201413 | A1 | * | 10/2003 | Hirota et al. | 251/30.01 |

FOREIGN PATENT DOCUMENTS

| | | |
|---|---|---|
| DE | 8317753.1 | 11/1984 |
| DE | 19504185 | 8/1996 |
| DE | 19805049 | 8/1999 |

* cited by examiner

*Primary Examiner*—J-Casimer Jacyna
(74) *Attorney, Agent, or Firm*—Ostrolenk, Faber, Gerb & Soffen, LLP

(57) ABSTRACT

An electromagnet having a hollow cylindrical coil former fitted with a coil winding and surrounded by a magnet housing. The coil former is bounded by upper and lower pole shoes. A nonmagnetic metal tube in the hollow cylinder of the magnet defines an armature space for a magnet armature that divides the armature space into first and second chambers, which are connected via a pressure equalizing channel in the magnet armature. A push rod passes through an axial hole in the lower pole shoe, to a control piston of a hydraulic valve, whose interior is connected via a further pressure equalizing channel in the lower pole shoe to the first chamber of the armature space. The push rod is a profiled rod contacting the magnet armature, the rod is of a cross-sectional shape different than that of the axial hole in the lower pole shoe and of a cross-sectional area less than that of the axial hole. The magnet armature has a central longitudinal hole of a diameter smaller than the largest profile width and larger than the smallest profile width of the push rod.

15 Claims, 3 Drawing Sheets

ELECTROMAGNET, IN PARTICULAR A PROPORTIONAL MAGNET FOR OPERATING A HYDRAULIC VALVE

FIELD OF THE INVENTION

The invention relates to an electromagnet which can be applied in a particularly advantageous manner to a proportional magnet, which is arranged within a hydraulic system of an apparatus for varying the control times of inlet or outlet valves for an internal combustion engine, for operating a hydraulic valve.

BACKGROUND TO THE INVENTION

DE 195 04 185 A1 discloses an electromagnet of this general type for operating a hydraulic valve. It has a coil former which is fitted with at least one coil winding and has an external circumference surrounded by a magnet housing. At the end, this coil former is bounded by an upper pole shoe, which is formed by an annular pole disk with a pole tube inserted in it and on which an electrical connecting body rests. It is also bounded by a lower pole shoe, which is formed by a pole plate with an integrally formed pole core and projects into the hollow cylinder of the coil former. The hollow cylinder of the coil former is clad with a nonmagnetic metal tube, having a cavity in the form of an armature space for a cylindrical magnet armature which moves axially. The magnet armature in turn divides the armature space into a first chamber and a second chamber, which are connected to one another via a number of eccentric axial holes in the magnet armature, in order to equalize the pressure of operating fluid which enters the armature space via the hydraulic valve. Furthermore, a push rod is mounted in a central basic hole in the valve-side end face of the magnet armature, is passed through a likewise central axial hole in the lower pole shoe, and is connected to a control piston which is arranged in the interior of a valve housing of a hydraulic valve. The valve housing of the hydraulic valve case rests on the lower pole shoe of the electromagnet, forming a seal. The interior of the valve housing, which guides the control piston, is connected to the first chamber of the armature space via a further eccentric hole, which is arranged alongside the central axial hole, in the lower pole shoe for pressure equalization.

However, this known electromagnet has the disadvantage that its individual parts require precise and costly manufacture and a high level of installation complexity due to their design configuration and their arrangement with respect to one another, causing production of such an electromagnet to be expected to be very costly. For production engineering, for example, it has been found to be very costly to design the magnet armature and the push rod as an assembly in which these items are firmly connected to one another, while at the same time passing the push rod through the central axial hole in the lower pole shoe. This requires complex calibration work on all the parts to avoid axial offsets between the longitudinal axis of the magnet armature and the longitudinal axis of the push rod, and between the push rod and the longitudinal axis of the central axial hole in the lower pole shoe. Such axis offsets would cause the radial air gaps between the magnet armature and the armature guide and/or between the push rod and the axial hole to not be of equal magnitude. In consequence, the magnet armature or the push rod thus rest on the armature guide or on the axial hole at one point when a current or flow is passed through the electromagnet, causing a friction force to act on the magnet armature in the opposite sense to its movement direction. This could lead to unacceptably high hysteresis. Furthermore, however, the eccentric pressure equalizing channels arranged in the magnet armature and in the lower pole shoe have been found to be highly costly, since they normally have to be drilled, and eccentric incorporation of these holes significantly increases the manufacturing costs.

OBJECT OF THE INVENTION

The invention therefore has the object of providing an electromagnet, in particular a proportional magnet for operating a hydraulic valve, wherein its individual parts and their arrangement with respect to one another are physically simple, involve a low level of manufacturing and assembly effort, and have optimized-cost production. At the same time, it optimally guides the magnet armature and the push rod and has adequate capabilities for pressure equalization between the first chamber and the second chamber of the armature space, as well as between the first chamber and the interior of a valve housing.

SUMMARY OF THE INVENTION

According to the invention, this object is achieved for an electromagnet wherein the push rod, which is guided in the axial hole in the lower pole shoe, is in the form of a loose profiled rod which is separated from the magnet armature. The cross-sectional shape of the rod is different from that of the axial hole and its cross-sectional area is less than that of the axial hole, so that the free cross-sectional spaces within the axial hole in the lower pole shoe may also be used as pressure equalizing channels between the interior of the valve housing of the hydraulic valve and the first chamber in the armature space of the electromagnet. The separation of the push rod from the magnet armature of the electromagnet has the advantages that it is no longer possible for any axis offsets to occur between the longitudinal axis of the magnet armature and the longitudinal axis of the push rod, or between the latter and the longitudinal axis of the axial hole in the lower pole shoe, and that both the magnet armature and the push rod can thus be guided optimally, separately from one another. The axial hole in the lower pole shoe is preferably in the form of a central through-hole with a circular profile cross section, having a diameter that corresponds approximately to the largest profile width of the push rod. This makes it possible to guide the push rod exactly in the axial hole in the lower pole shoe, while at the same time saving the previously normal separate pressure equalizing channels, which were formed by complex eccentric holes in the lower pole shoe, since these are now formed by the free cross-sectional spaces which are produced alongside the profiled push rod in the axial hole.

A further feature for optimized-cost production of the electromagnet is that the magnet armature, which has an end face that rests on the push rod, has a central longitudinal hole with a diameter that is smaller than the largest profile width of the push rod and that is larger than the smallest profile width of the push rod. As a result, the end face of the push rod only partially covers the longitudinal hole in the magnet armature so that the longitudinal hole can be used as a pressure equalizing channel between the first chamber and the second chamber in the armature space of the electromagnet via the free cross-sectional areas of its opening. This configuration is possible only because of the separation of the magnet armature and push rod and by the profiled configuration of the push rod. It has the advantage that a pressure equalizing channel between the chambers in the armature space of the electromagnet is formed by a single, central through-hole in the magnet armature. The through-hole can be produced relatively easily and possibly even without cutting. As a result, it is possible to save the previously normal separate pressure equalizing channels, which were likewise formed by costly eccentric holes or by axial grooves in the magnet armature. Those profile sections of the profiled push rod which project beyond the opening of the longitudinal hole in the magnet armature and rest on the end face of the magnet armature ensure that, despite the shape and size of the push rod, which is guided centrally in the lower pole shoe and despite the longitudinal hole, which is likewise arranged in the central magnet armature, a contact surface which is sufficient to transmit the electromagnetically produced axial movements of the magnet armature to the push rod is provided between the magnet armature and the push rod. The required continuous contact between the magnet armature and the push rod is ensured, in a manner which allows force to be transmitted by a spring element which is operatively connected to the control piston of the hydraulic valve, and this control piston presses the push rod against the end face of the magnet armature, and produces the force equilibrium with respect to the electromagnet to which flow of current is passing.

In one refinement of the electromagnet, the push rod preferably has a polygonal profile with either rounded profile edges, or a round profile, and which is flattened on one or more sides. It is comprised of a brass alloy. Such profiles can be produced without using cutting machining operations by means of extrusion, and can likewise be cut to the appropriate length by stamping without metal cutting machining. This contributes to optimized-cost production of the electromagnet. Triangular or quadrilateral profiles are particularly suitable. In order to improve their guidance, they are rounded on their profile edges with the radius of the axial hole in the lower pole shoe, or have round profiles which have a slightly smaller diameter than the axial hole in the lower pole shoe and are designed to have one or more axial flats on their outer surface. Other suitable profiles are oval profiles or else round profiles, which are guided in an oval axial hole in the lower pole shoe, and/or the use of some other suitable material for the push rod, as well.

For use of the electromagnet according to the invention as an operating element of a hydraulic valve, which is intended for controlling an apparatus for camshaft movement, both the cross-sectional areas of the pressure equalizing channels in the lower pole shoe and those cross-sectional areas of the longitudinal hole in the magnet armature which are not covered by the end face of the push rod can each have an overall flow cross section of at least 0.5 $mm^2$, if a normal static operating pressure of up to 10 bar is used within the hydraulic system. This overall flow cross section is considered when choosing the profile shape and the profile size for the push rod. It represents a lower limit value at which any damping effect on the magnet armature or any increase in the hysteresis due to excessively small cross sections in the pressure equalizing channels can be excluded, even at a low pressure medium temperatures and if the pressure medium viscosity is high.

Finally, for optimized-cost production of the electromagnet, the nonmagnetic metal tube in the hollow cylinder of the coil former is preferably a cup-shaped copper tube which is closed at one end, seals the coil winding against the operating fluid of the hydraulic valve, and has an inner face in the form of a guide for the magnet armature. Such a copper tube is closed at one end. It can be produced at low cost as a deep-drawn part without metal cutting machining. This makes it possible to save a pressure tube sleeve, which is also normally used in the armature space in such electromagnets and is generally comprised of a highly alloyed stainless steel. However, instead of using a cup-shaped copper tube, it is also possible to use a tube of identical construction but comprised of some other suitable material.

Furthermore, it has been found to be advantageous to provide the magnet armature and/or the inner face of the nonmagnetic metal tube with a low-friction or wear-reducing coating in order to reduce the hysteresis of the magnet armature and in order to increase the life of the electromagnet. This coating may, for example, be in the form of a PTFE coating or a tin, silver, copper, nickel or anodized coating, depending on the materials of the metal tube and of the magnet armature. In addition or else as an alternative to such a coating, it is also advantageous not to guide the magnet armature by its entire outer surface on the inner face of the magnetic metal tube, in order to further reduce the friction coefficients and the hysteresis of the magnet armature. In order to define its bearing points on the inner face of the nonmagnetic metal tube, the magnet armature is therefore machined, preferably by center-less grinding, at its upper and lower ends, with the diameter of the magnet armature between the bearing points being reduced minimally, in a known manner.

The electromagnet according to the invention, in particular a proportional magnet for operating a hydraulic valve, thus has the advantage over known electromagnets in that it is comprised of physically simple and mutually arranged individual parts whose manufacture and assembly require little effort, which considerably reduces the costs for production of the electromagnet. In particular, the separation of the magnet armature and push rod into individual parts, which are each separately guided, enables completely saving producing the eccentric pressure equalizing channels, which previously had to be additionally incorporated in the magnet armature and in the lower pole shoe and this involved considerable effort. This also completely saves the complex calibration work to avoid axis offsets between the longitudinal axes of the magnet armature, of the push rod and of the central axial hole in the lower pole shoe.

BRIEF DESCRIPTION OF THE DRAWINGS

The invention is explained in detail in the following text using an exemplary embodiment, and is illustrated schematically in the associated drawings, in which.

DETAILED DESCRIPTION OF THE DRAWINGS

Figure 1:
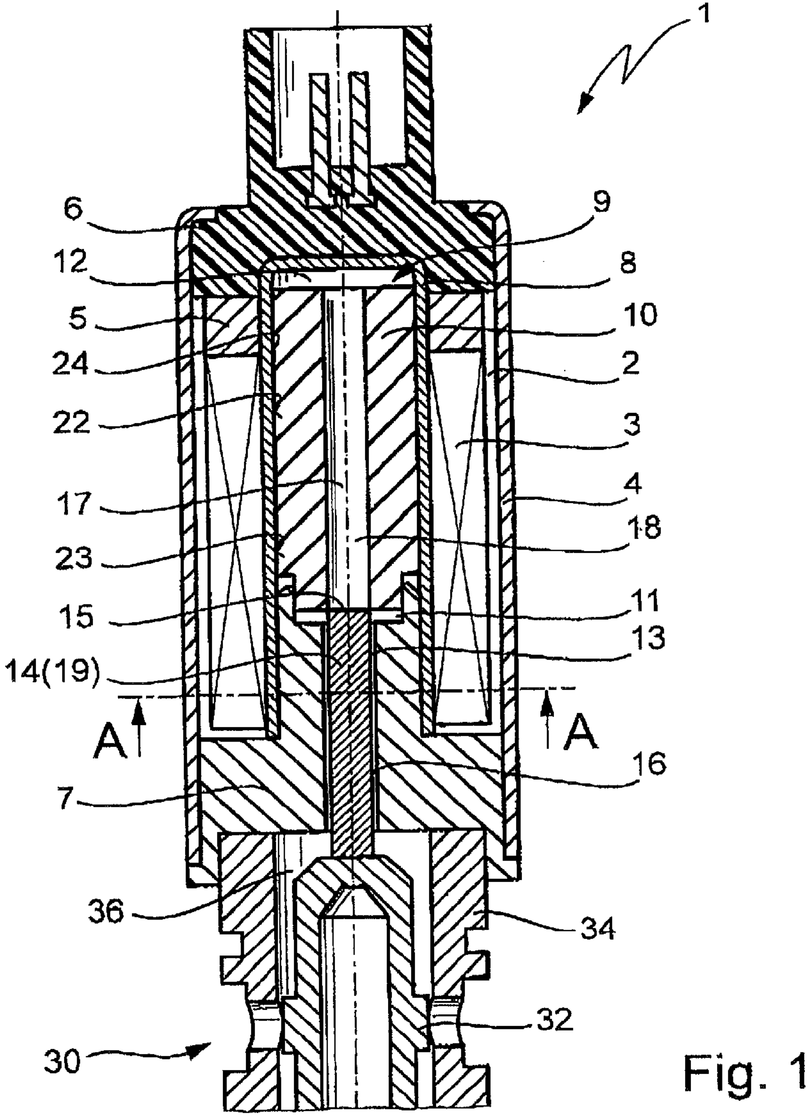
FIG. 1 shows a longitudinal section through a first embodiment of an electromagnet according to the invention.
Figure 3:
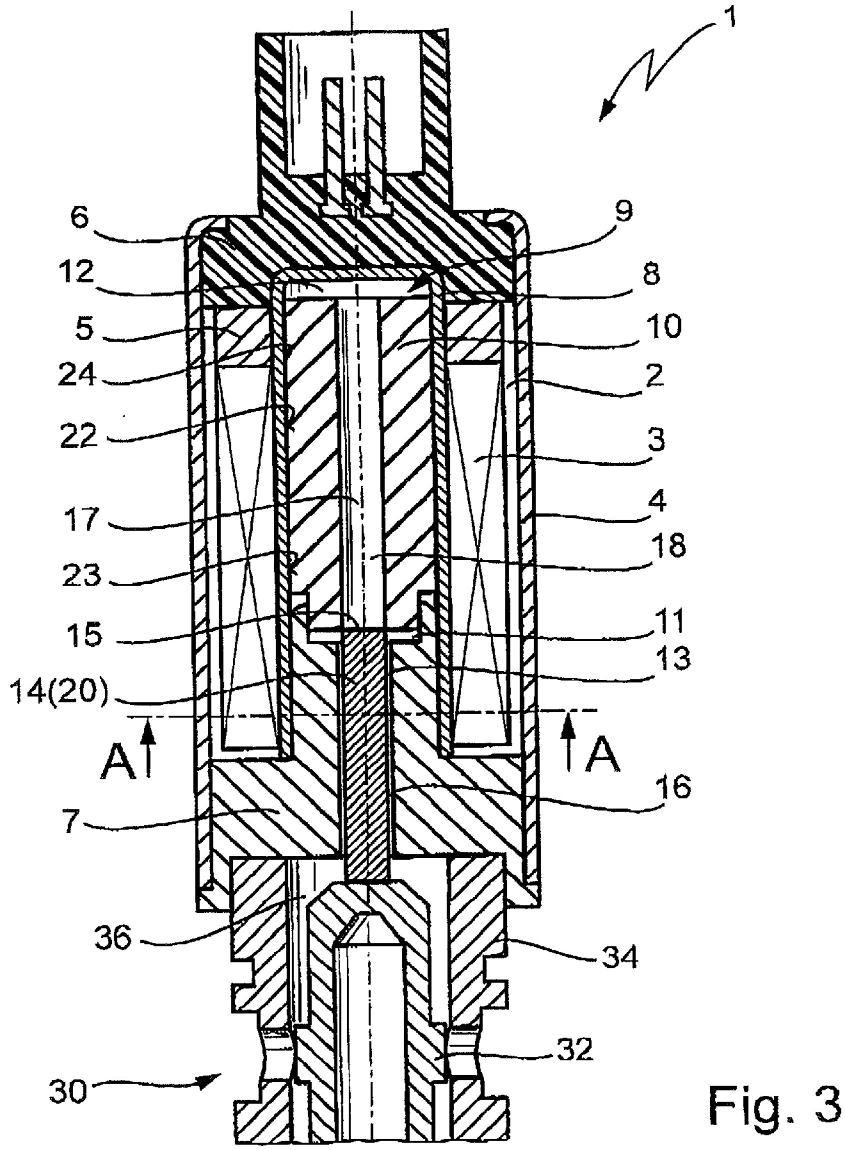
FIG. 3 shows a longitudinal section through a second embodiment of an electromagnet according to the invention.
Figure 5:
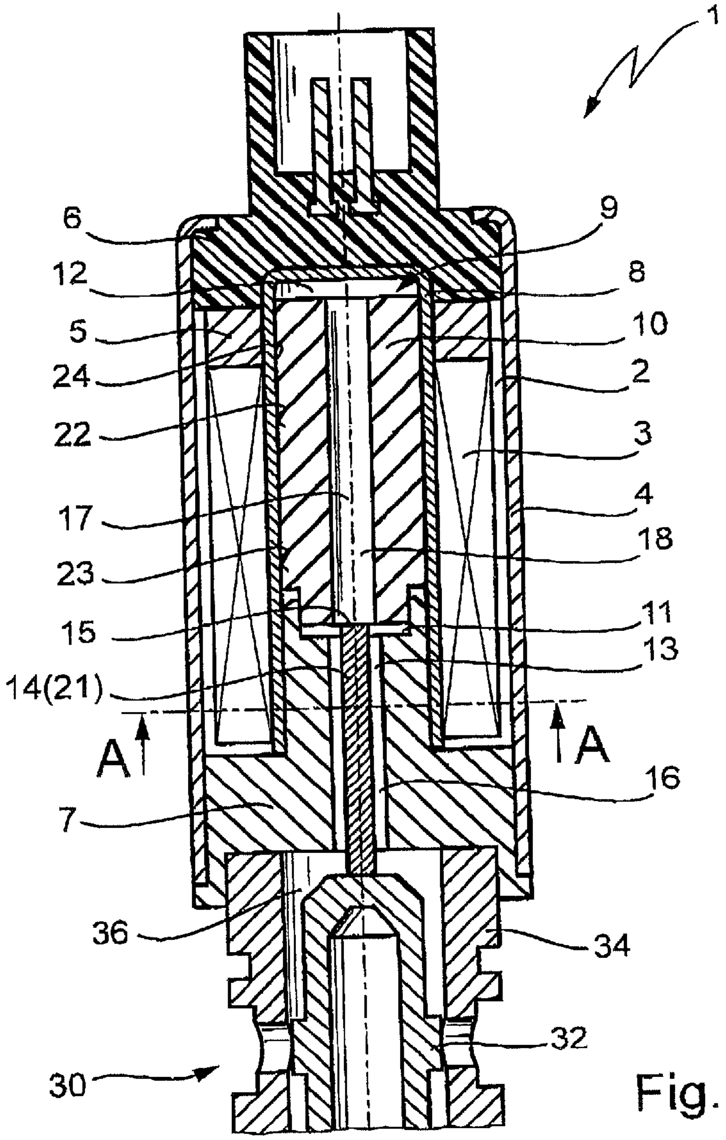
FIG. 5 shows a longitudinal section through a third embodiment of an electromagnet according to the invention.

FIGS. 1, 3 and 5 each show a respective electromagnet 1 in the form of a proportional magnet, which is particularly suitable for operating a hydraulic valve 30, shown schematically, for controlling an apparatus for varying the control times of inlet and outlet valves of an internal combustion engine, not shown. The electromagnet 1 includes a hollow cylindrical coil former 2, which is fitted with a coil winding 3 and is surrounded on its external circumference by a magnet housing 4. This coil former 2 is bounded at the ends by an upper pole shoe 5, on which an electrical connecting part 6 rests, and by a lower pole shoe 7, which projects a distance into the hollow cylinder of the coil former 2.

A nonmagnetic metal tube 8 is arranged in the hollow cylinder of the coil former 2. The cavity of the tube 8, above the lower pole shoe 7 is in the form of an armature space 9 for receiving a cylindrical magnet armature 10 which moves axially in the cavity. The magnet armature 10 in turn divides the armature space 9 into a first chamber 11 and a second chamber 12, which are connected to one another via a pressure equalizing channel 18, described below, in the magnet armature 10 for pressure equalization of operating fluid which enters the armature area 9 via the hydraulic valve.

FIGS. 1, 3 and 5 show that the magnet armature 10 is connected via a push rod 14, which passes through a central axial hole 13 in the lower pole shoe 7, to a control piston 32 (not shown) of a hydraulic valve 30, and the control piston is guided in a valve housing 34. That housing 34 rests on the lower pole shoe 7 of the electromagnet 1 forming a seal, and the interior 36 of the housing 34 is connected to the first chamber 11 of the armature space 9 via a further pressure equalizing channel 16 in the lower pole shoe 7.

Furthermore, FIGS. 1, 3 and 5 show that the push rod 14 which is guided in the axial hole 13 in the lower pole shoe 7 has the form of a loose, profiled rod. It is separated from the magnet armature 10.

Figure 2:
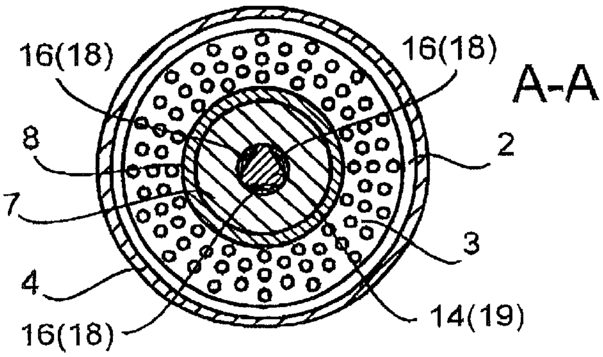
FIG. 2 shows a cross section A—A as shown in FIG. 1 through the first embodiment.
Figure 4:
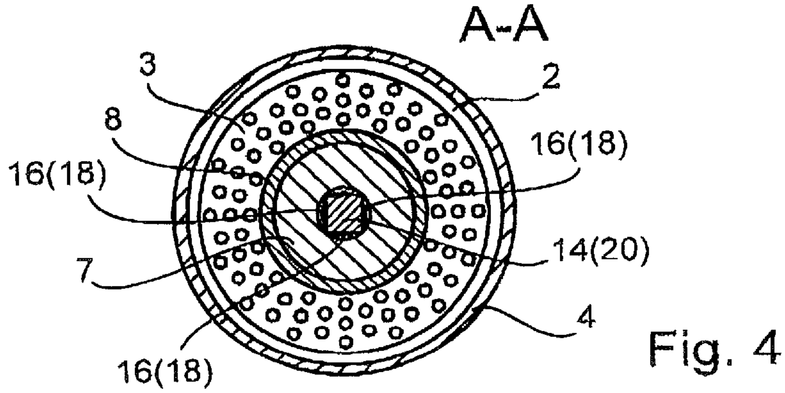
FIG. 4 shows a cross section A—A as shown in FIG. 3 through the second embodiment.
Figure 6:
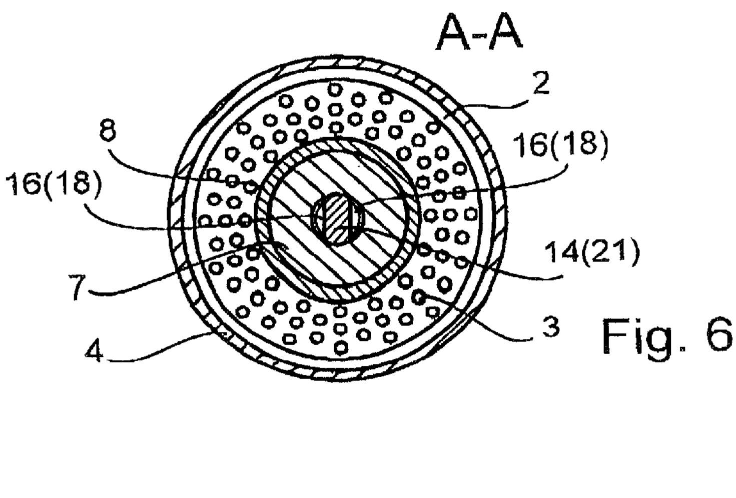
FIG. 6 shows a cross section A—A as shown in FIG. 5 through the third embodiment.

As can be seen in FIGS. 2, 4 and 6, the cross-sectional shape of the rod 14 is different than the cross-sectional shape of the axial hole 13 and the cross-sectional area of the rod is smaller than the cross-sectional area of the axial hole 13. In an advantageous embodiment, the push rod 14 is either in the form of a triangular profile 19, as illustrated in FIG. 2, or has profile edges which are rounded, or has a quadrilateral profile 20 with profile edges that are likewise rounded as shown in FIG. 4, or else it has a round profile 21 which is flattened parallel on two sides, as in FIG. 6. The rod 14 is comprised of a brass alloy. It can be produced by extrusion without metal cutting machining and can be stamped to length. The free cross-sectional spaces which are produced by these rod profiles the axial hole 13 in the lower pole shoe 7 then form the pressure equalizing channels 16. Those channels 16 connect the interior 36 of the valve housing 34 of the hydraulic valve 30 to the first chamber 11 in the armature space 9 in the electromagnet 1.

As seen from FIGS. 1, 3 and 5, the end of the push rod 14 rests loosely on the end of the magnet armature 10. The armature has a central longitudinal hole 17 with a diameter, as indicated in FIGS. 2, 4 and 6, that is smaller than the largest profile width of the push rod 14 and is larger than the smallest profile width of the push rod 14. Thus, the end face 15 of the push rod 14 only partially covers the opening of the longitudinal hole 17 in the magnet armature 10, so that the longitudinal hole 17 in the magnet armature 10 forms the pressure equalizing channel 18 over the free cross-sectional areas of its opening. This connects the first chamber 11 to the second chamber 12 in the armature space 9 of the electromagnet 1. Each of the cross-sectional areas of the longitudinal hole 17 in the magnet armature 10, which areas are not covered by the end face 15 of the push rod 14, as well as the cross-sectional areas of the pressure equalizing channels 16 in the lower pole shoe 7, has an overall flow cross section of at least 0.5 $mm^2$, since the hydraulic valve 30 which is operated by the electromagnet 1 is intended for controlling a hydraulic apparatus for camshaft movement, and a static operating pressure of up to 10 bar is used within the hydraulic system of this apparatus.

Finally, FIGS. 1, 3 and 5 show that the nonmagnetic metal tube 8 in the hollow cylinder of the coil former 2 is in the form of a cup-shaped copper tube which is closed at one end, seals the coil winding 3 against the operating fluid of the hydraulic valve, and has an inner face 22 that is a guide for the magnet armature 10. In order to define bearing points 23, 24 for the armature on the inner face 22 of the copper tube 8, the magnet armature 10 is processed by center-less grinding at the upper and lower ends, for reducing its diameter minimally between the bearing points 23, 24. In addition, the bearing points 23, 24 have a PTFE coating, which is not separately illustrated and which produces low friction and reduces the wear, and which contributes to reducing the hysteresis of the magnet armature and to increasing the life of the electromagnet 1.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An electromagnet comprising:

a hollow, cylindrical coil former having upper and lower ends; a coil winding fitted within the coil former; a magnet housing surrounding the coil former;

an upper pole shoe at the upper end of the coil former, an electrical part resting on the upper pole shoe;

a lower pole shoe at the lower end of the coil former, the lower shoe being shaped to project a distance partially into the hollow cylinder of the coil former;

a nonmagnetic metal tube disposed in the hollow cylinder of the coil former and having an internal cavity which defines an armature space above the lower pole shoe;

a cylindrical magnet armature fitted into the armature space, moveable along the armature space and guided in such movement by the metal tube; the magnet armature being of shorter length along the metal tube than the armature space; the magnet armature dividing the armature space into a first chamber and a second chamber separated by the armature; at least one axially extending pressure equalizing channel in the magnet armature connecting the first and second chambers of the armature space;

an axial hole passing through the lower pole shoe between outside the lower pole shoe and into the first chamber of the armature space;

a push rod passing through the axial hole in the lower pole shoe, being separate from and engageable with the magnet armature, extending outside the lower pole shoe and engageable with another object; the axial hole in the lower pole shoe and the push rod being respectively so shaped that the push rod is guided in the axial hole in the lower pole shoe; the push rod is a loose rod with an external profile in the axial hole; the axial hole having a first cross sectional shape and the push rod having a second cross sectional shape different than the first cross sectional shape of the axial hole, wherein the first and second cross sectional shapes have respective first and second cross sectional areas, the second cross sectional area of the rod is less than the first cross sectional area of the axial hole for defining free cross sectional spaces within the axial hole in the lower pole shoe and outside the push rod, and the free cross sectional spaces define pressure equalizing channels between the first chamber of the armature space and outside the lower pole shoe.

2. In combination, the electromagnet of claim 1 and a hydraulic valve, the valve having a valve housing with an interior and a control piston moveable in the valve housing, the push rod of the electromagnet being connected to the control piston of the hydraulic valve;

the valve housing being mounted on the electromagnet at such location and in such manner that the valve housing interior is connected by a pressurized equalizing channel in the lower pole shoe to the first chamber of the armature space.

3. The combination of claim 2, wherein the non-magnetic metal tube has the form of a cup-shaped copper tube having one end which is closed and is shaped and sized as to seal the coil winding against operating fluid of the hydraulic valve and the tube being shaped to form a guide for movement of the magnet armature in the armature space.

4. The electromagnet of claim 1, wherein the magnet armature has an end face on which the push rod rests, a central longitudinal hole in the magnet armature end face with a diameter smaller than the largest width of the profile of the push rod and larger than the smallest width of the profile of the push rod, and the push rod has an end at the central longitudinal hole of the armature, the respective diameter of the central longitudinal hole and the profile of the end of the push rod are such that the end of the push rod partially covers the longitudinal hole in the armature for enabling the longitudinal hole to define a pressure equalizing channel between the first and the second chambers of the armature space of the electromagnet.

5. The electromagnet of claim 4, wherein the push rod has a polygonal profile.

6. The electromagnet of claim 5, wherein the polygonal profile of the push rod comprises profile edges of the rod which are rounded, or the rod having a rounded profile with at least one side flattened.

7. The electromagnet of claim 5, wherein the push rod is comprised of a brass alloy.

8. The electromagnet of claim 7, wherein the push rod is produced by extrusion without metal cutting machining or is to be cut to length by stamping.

9. The electromagnet of claim 1, wherein the push rod has a polygonal profile.

10. The electromagnet of claim 4, wherein each of the cross sectional areas of the pressure equalizing channel in the lower pole shoe which is defined between the profile of the push rod and the axial hole in the lower pole shoe, and the cross sectional area of the longitudinal hole in the magnet armature not covered by the end of the push rod each have a flow cross section of at least 0.5 $mm^2$ and a static operating pressure of up to 10 bar.

11. The electromagnet of claim 1, wherein the non-magnetic metal tube has the form of a cup-shaped copper tube having one end which is closed and is shaped and sized as to seal the coil winding against operating fluid of the hydraulic valve and the tube being shaped to form a guide for movement of the magnet armature in the armature space.

12. The electromagnet of claim 11, wherein the magnet armature is machined at an upper end thereof and at a lower end thereof, defining bearing points between the magnet armature and the inner face of the non magnetic metal tube, with the diameter of the magnet armature being minimally reduced between the bearing points thereof.

13. The electromagnet of claim 10, further comprising a low friction or wear reducing coating between the magnet armature and the inner face of the non-magnetic metal tube for reducing the hysteresis of the magnet armature.

14. The electromagnet of claim 13, wherein the lower friction coating comprises a PTFE coating on at least one of the magnet armature and the non magnetic metal tube.

15. The electromagnet of claim 13, wherein the magnet armature is machined at an upper end thereof and at a lower end thereof, defining bearing points between the magnet armature and the inner face of the non magnetic metal tube, with the diameter of the magnet armature being minimally reduced between the bearing points thereof.

* * * * *